(12) United States Patent
Nojima

(10) Patent No.: US 12,462,835 B2
(45) Date of Patent: Nov. 4, 2025

(54) DISK APPARATUS INCLUDING FLEXURE HAVING PORTIONS OF DIFFERENT THICKNESSES

(71) Applicants: Kabushiki Kaisha Toshiba, Tokyo (JP); Toshiba Electronic Devices & Storage Corporation, Tokyo (JP)

(72) Inventor: Yusuke Nojima, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/591,696

(22) Filed: Feb. 29, 2024

(65) Prior Publication Data
US 2025/0104734 A1 Mar. 27, 2025

(30) Foreign Application Priority Data
Sep. 22, 2023 (JP) ................. 2023-156636

(51) Int. Cl.
*G11B 5/48* (2006.01)
*G11B 5/53* (2006.01)
*G11B 5/82* (2006.01)

(52) U.S. Cl.
CPC .......... *G11B 5/4833* (2013.01); *G11B 5/4853* (2013.01); *G11B 5/531* (2013.01); *G11B 5/82* (2013.01)

(58) Field of Classification Search
None
See application file for complete search history.

(56) References Cited

U.S. PATENT DOCUMENTS

| | | | |
|---|---|---|---|
| 6,963,471 B2 | 11/2005 | Arai et al. | |
| 8,854,826 B2 | 10/2014 | Ohsawa | |
| 8,885,294 B2 | 11/2014 | Kudo | |
| 9,047,895 B2 | 6/2015 | Yamaguchi | |
| 9,530,441 B2 | 12/2016 | Kikuchi et al. | |
| 9,804,496 B2 | 10/2017 | Yamaguchi | |
| 2002/0154445 A1* | 10/2002 | Wada ............... | G11B 5/4826 |
| 2003/0193753 A1* | 10/2003 | Arai .................. | G11B 5/486 |
| 2005/0030670 A1* | 2/2005 | Ando ................ | G11B 5/4833 |
| | | | 360/245.9 |
| 2006/0221504 A1* | 10/2006 | Hanya ............... | G11B 5/486 |
| | | | 360/245.9 |

(Continued)

FOREIGN PATENT DOCUMENTS

CN 1892876 A * 1/2007 ........... G11B 5/4833

*Primary Examiner* — William J Klimowicz
(74) *Attorney, Agent, or Firm* — Kim & Stewart LLP

(57) ABSTRACT

A disk apparatus includes a carriage, a magnetic disk, a base plate, a load beam, a flexure, and a magnetic head. The carriage rotates around a first rotation axis. The base plate includes a first surface facing the magnetic disk and is attached to the carriage. The load beam is attached to the base plate. The flexure includes a plurality of wirings and is attached to the base plate and the load beam. The magnetic head is attached to the flexure and electrically connected to at least one of the plurality of wirings. The flexure includes a thin portion that is thinner than other portions of the flexure. The thin portion includes a first portion which covers the first surface and at which the plurality of wirings extends in non-parallel directions with respect to each other.

20 Claims, 8 Drawing Sheets

(56) References Cited

U.S. PATENT DOCUMENTS

| | | | |
|---|---|---|---|
| 2007/0133128 A1* | 6/2007 | Arai | G11B 5/486 |
| | | | 360/245.9 |
| 2008/0239576 A1* | 10/2008 | Higashi | G11B 5/484 |
| 2014/0362467 A1* | 12/2014 | Nojima | G11B 5/4873 |
| | | | 360/97.13 |
| 2016/0267927 A1* | 9/2016 | Kikuchi | G11B 5/4853 |
| 2024/0274153 A1* | 8/2024 | Muraki | G11B 5/4833 |

* cited by examiner

DISK APPARATUS INCLUDING FLEXURE HAVING PORTIONS OF DIFFERENT THICKNESSES

CROSS-REFERENCE TO RELATED APPLICATION(S)

This application is based upon and claims the benefit of priority from Japanese Patent Application No. 2023-156636 filed on Sep. 22, 2023, the entire contents of which are incorporated herein by reference.

FIELD

Embodiments described herein relate generally to a disk apparatus.

BACKGROUND

A disk apparatus such as a hard disk drive (HDD) includes, for example, a magnetic disk and a head stack assembly (HSA). The HSA includes a carriage that rotates, a base plate attached to an arm of the carriage, a load beam extending from the base plate, a flexure attached to the load beam, and a magnetic head mounted at the flexure.

The HSA moves the magnetic head to a desired position on the magnetic disk so as to cause the magnetic head to read and write information from and to the magnetic disk. A wiring of the flexure transmits, for example, a write signal input to the magnetic head and a read signal output from the magnetic head.

The flexure is located in the vicinity of the magnetic disk. Thus, for example, when a shock or a vibration acts on the disk apparatus, the flexure may come into contact with the magnetic disk.

DETAILED DESCRIPTION

Embodiments provide a disk apparatus that can suppress a flexure of the disk apparatus from coming into contact with a magnetic disk of the disk apparatus.

In general, according to one embodiment, a disk apparatus includes a carriage, a magnetic disk, a base plate, a load beam, a flexure, and a magnetic head. The carriage is configured to rotate around a first rotation axis. The base plate includes a first surface that faces the magnetic disk and is attached to the carriage. The load beam is attached to the base plate. The flexure includes a plurality of wirings and is attached to the base plate and the load beam. The magnetic head is attached to the flexure, electrically connected to at least one of the plurality of wirings, and configured to read and write information from and to the magnetic disk. The flexure includes a thin portion that is thinner than other portions of the flexure. The thin portion includes a first portion which covers the first surface and at which at least two of the plurality of wirings extend in non-parallel directions with respect to each other.

First Embodiment

A first embodiment will be described below with reference to FIGS. 1 to 5. In this specification, components and the description of the components may be expressed in a plurality of different ways. The components and the descriptions given herein are only examples and not limited by the expressions used in this specification. The components may be identified by names different from the ones used in this specification. In addition, the components may also be described differently from the way they are described in this specification.

In the following description, "suppress" is defined as, for example, preventing the occurrence of an event, an action, or an effect, or reducing the extent of an event, an action, or effect. In the following description, "restrict" is defined as, for example, preventing movement or rotation, or tolerating movement or rotation within a predetermined range and preventing movement or rotation beyond the predetermined range.

Figure 1:
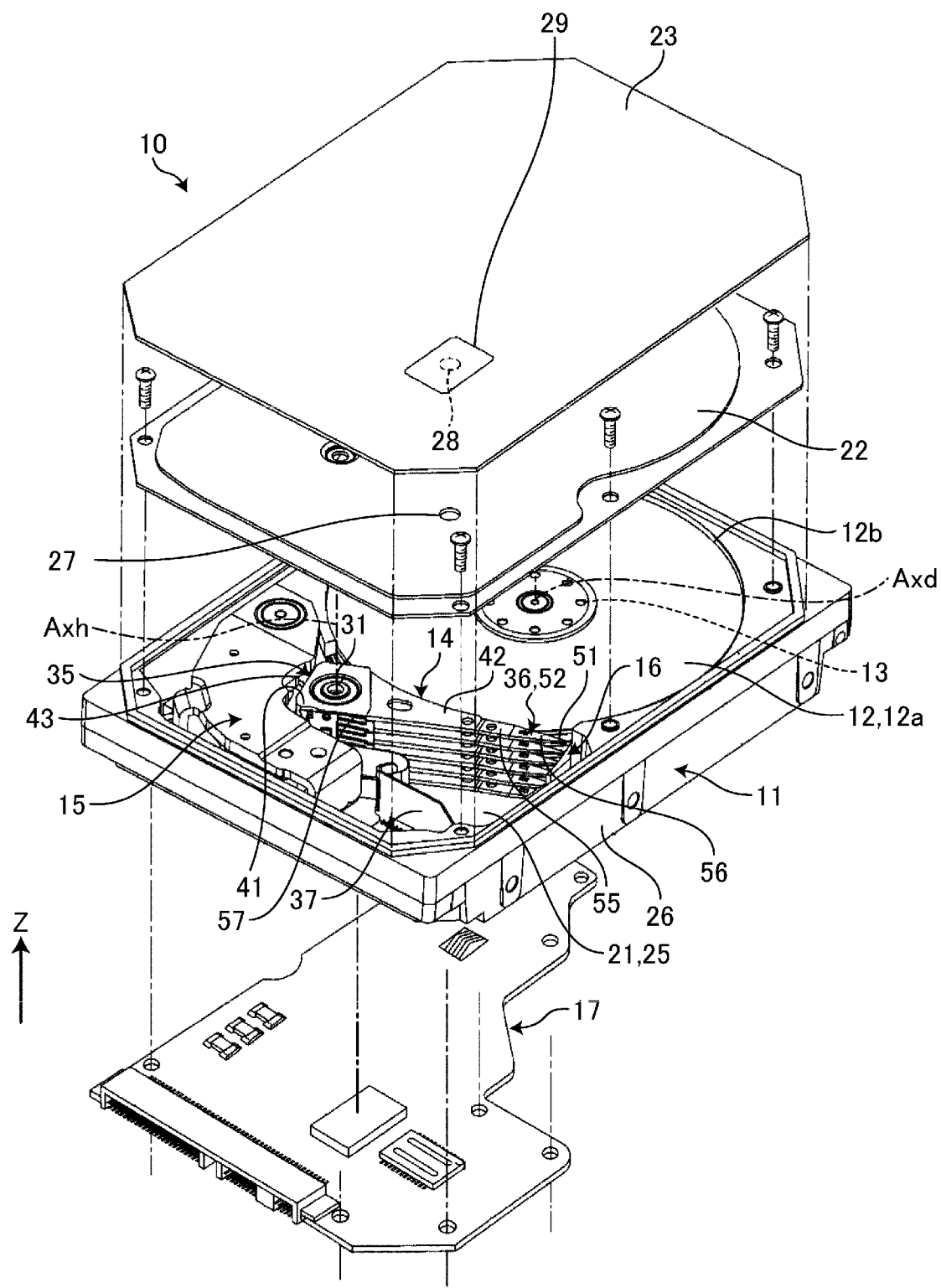
FIG. 1 is a perspective view illustrating an HDD according to a first embodiment in a disassembled state.

FIG. 1 is a perspective view illustrating a hard disk drive (HDD) 10 according to the first embodiment in a disassembled state. The HDD 10 is an example of a disk apparatus and may be referred to as an electronic apparatus, a storage apparatus, an external storage apparatus, or a magnetic disk apparatus. The HDD 10 of the present embodiment is a so-called 3.5-inch HDD. The HDD 10 is not limited to this example.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The magnetic disk 12 may also be referred to as a disk or a platter.

In the present specification, a Z axis and a Z direction are defined as illustrated in FIG. 1 for convenience purposes. The Z axis is provided along the thickness of the HDD 10. The Z direction is a direction along the Z axis and includes a +Z direction indicated by the arrow of the Z axis and a −Z direction which is a direction opposite to the arrow of the Z axis.

The housing 11 includes a base 21, an inner cover 22, and an outer cover 23. The housing 11 is not limited to this example. Each of the base 21, the inner cover 22, and the outer cover 23 is made of, for example, a metal material such as an aluminum alloy. The materials of the base 21, the inner cover 22, and the outer cover 23 may be different from each other.

The base 21 is formed in a substantially rectangular solid box shape that opens in the +Z direction. The base 21 accommodates the plurality of magnetic disks 12, the spindle motor 13, the HSA 14, the VCM 15, and the ramp load mechanism 16.

The base 21 includes a bottom wall 25 and a side wall 26. The bottom wall 25 is formed in a substantially rectangular (quadrangular) plate shape that extends substantially orthogonal to the Z direction. The side wall 26 protrudes from an edge of the bottom wall 25 substantially in the +Z direction, and is formed in a substantially rectangular frame shape. The bottom wall 25 and the side wall 26 are integrally formed.

The inner cover 22 is attached to an end portion of the side wall 26 in the +Z direction, for example, with a screw so as to close the base 21. The outer cover 23 covers the inner cover 22 and is attached to an end portion of the side wall 26 in the +Z direction, for example, by welding.

A vent hole 27 is provided in the inner cover 22. A vent hole 28 is provided in the outer cover 23. After components y are mounted inside the base 21 and the inner cover 22 and the outer cover 23 are attached to the base 21, the air inside the housing 11 is evacuated through the vent holes 27 and 28. Then, the interior of the housing 11 is filled with a gas different from air.

The gas to fill the interior of the housing 11 is, for example, a low-density gas having a density lower than the density of air, or an inert gas having low reactivity. For example, the interior of the housing 11 is filled with helium. The interior of the housing 11 may be filled with another gas. In addition, the interior of the housing 11 may be kept at vacuum, a low pressure close to vacuum, or a negative pressure lower than an atmospheric pressure.

The vent hole 28 of the outer cover 23 is closed by a seal 29. The seal 29 seals the vent hole 28 in airtight manner and restricts the gas filling the interior of the housing 11 from flowing out of the housing 11 through the vent hole 28.

The plurality of magnetic disks 12 is formed in a disk shape extending orthogonal to the Z direction. The plurality of magnetic disks 12 are stacked at intervals in the Z direction. Each of the plurality of magnetic disks 12 includes, for example, at least one recording surface 12a and an outer edge 12b.

Each of a plurality of recording surfaces 12a is a surface of the magnetic disk 12 facing substantially the +Z direction, or a surface of the magnetic disk 12 facing substantially the −Z direction. The recording surface 12a is a substantially flat surface orthogonal to the Z direction. A magnetic recording layer of the magnetic disk 12 is provided at the recording surface 12a.

The outer edge 12b is an end (outer circumference) of the magnetic disk 12 which is separated farthest from a central axis Axd of the magnetic disk 12. The central axis Axd is an example of a second rotation axis and is an imaginary axis extending substantially in the Z direction.

The spindle motor 13 supports the plurality of magnetic disks 12 and rotates the plurality of magnetic disks 12 around the central axis Axd. The central axis Axd is also the central axis of the spindle motor 13. The plurality of magnetic disks 12 is held at a hub of the spindle motor 13, for example, by a clamp spring.

The housing 11 is provided with a support shaft 31 which is separated from the magnetic disk 12 in a direction orthogonal to the central axis Axd. The support shaft 31 extends, for example, from the bottom wall 25 of the housing 11 substantially in the +Z direction. The HSA 14 is rotatably supported by the support shaft 31.

The HSA 14 can rotate around a central axis Axh. The central axis Axh is an example of a first rotation axis and is an imaginary axis extending substantially in the Z direction. The central axis Axh is, for example, the center of rotation of the HSA 14 and is also the central axis of the support shaft 31. Thus, the central axis Axh is separated from the central axis Axd of the magnetic disk 12 in a direction orthogonal to the central axis Axd.

For convenience, an axial direction, a radial direction, and a circumferential direction are defined as below. The axial direction is a direction along the central axis Axh. The axial direction is the same as the Z direction. The radial direction is a direction orthogonal to the central axis Axh and includes a plurality of directions orthogonal to the central axis Axh. The circumferential direction is a direction of rotation around the central axis Axh and includes a direction of rotation clockwise and a direction of rotation counterclockwise around the central axis Axh.

The HSA 14 includes a carriage 35, a plurality of head gimbal assemblies (HGA) 36, and a flexible printed circuit board (FPC) 37. The carriage 35 includes an actuator block 41, a plurality of arms 42, and a coil holder 43.

The actuator block 41, the plurality of arms 42, and the coil holder 43 are integrally formed of aluminum, for example. The materials of the actuator block 41, the arm 42, and the coil holder 43 are not limited to this example.

The actuator block 41 is supported by the support shaft 31 via a bearing so as to be rotatable around the central axis Axh, for example. Accordingly, the carriage 35 can rotate around the central axis Axh.

The plurality of arms 42 protrudes in the radial direction from the actuator block 41. The HSA 14 may be divided into a plurality of parts, each including an actuator block 41, and each of the arms 42 may protrude from one of the actuator blocks 41.

Figure 2:
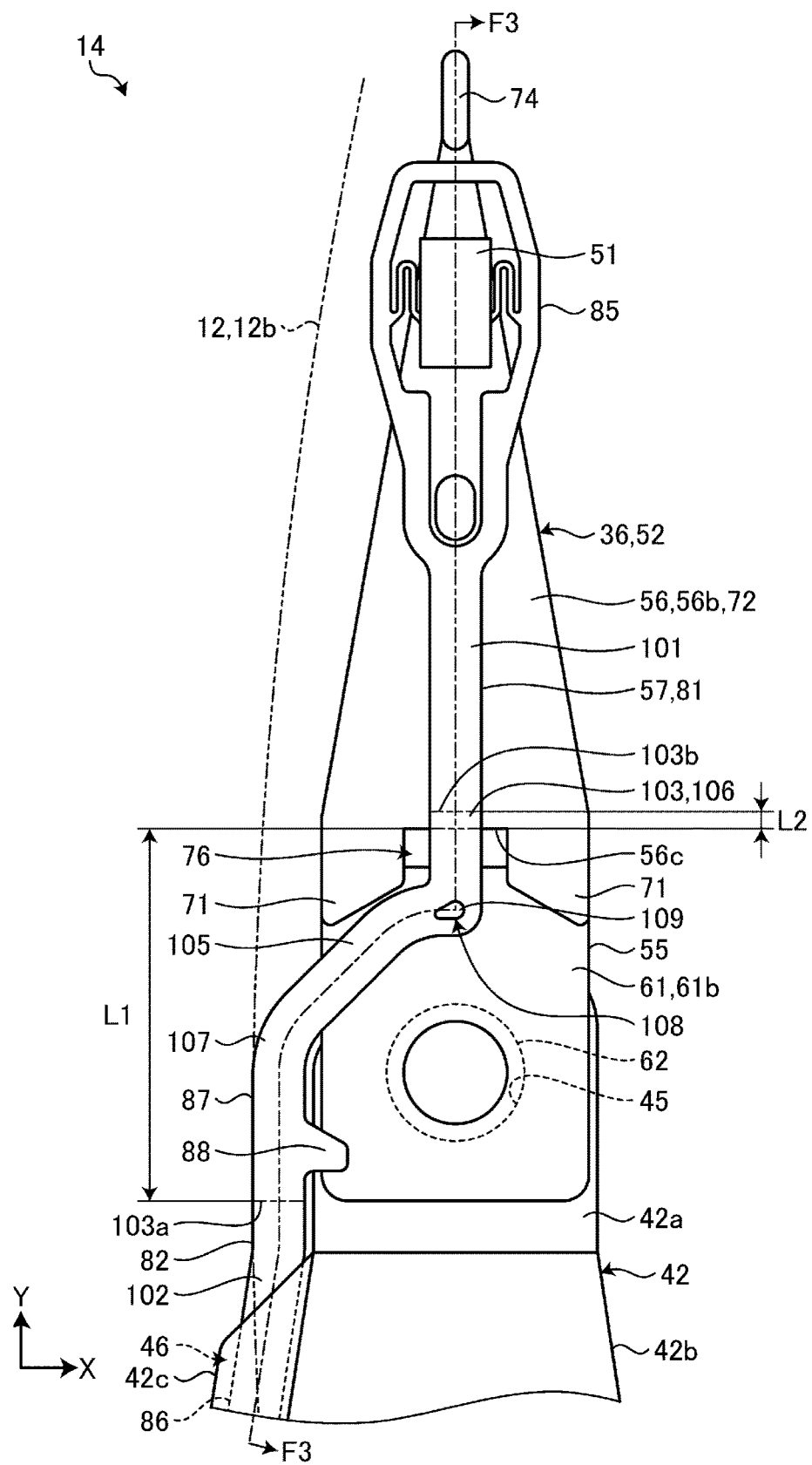
FIG. 2 is a plan view partially illustrating an HGA and an arm of the first embodiment.

FIG. 2 is a plan view partially illustrating the HGA 36 and the arm 42 of one part of the HSA 14 of the first embodiment when viewed in the +Z direction. In the present specification, an X axis and a Y axis are further defined as illustrated in FIG. 2. The X axis, the Y axis, and the Z axis are orthogonal to each other. The Y axis is provided along extending direction of the arm 42. Furthermore, in the present specification, an X direction and a Y direction are further defined. The X direction is a direction along the X axis and includes a +X direction indicated by the arrow of the X axis and a −X direction which is a direction opposite to the arrow of the X axis. The Y direction is a direction along the Y axis and includes a +Y direction indicated by the arrow of the Y axis and a −Y direction which is a direction opposite to the arrow of the Y axis.

The plurality of arms 42 extends in the +Y direction from the actuator blocks 41. Thus, the Y direction is considered the longitudinal direction of the arm 42. The X direction is the short-length direction of the arm 42. The X direction and the Y direction vary by the carriage 35 rotating around the central axis Axh.

The plurality of arms 42 are disposed at intervals in the axial direction. Each of the arms 42 is formed in a plate shape that can enter a gap that is between the magnetic disks 12 adjacent to each other in the axial direction. The plurality of arms 42 extends substantially in parallel.

The coil holder 43 in FIG. 1 protrudes in the −Y direction from the actuator block 41. The coil holder 43 holds a voice coil of the VCM 15. The VCM 15 includes the voice coil, a pair of yokes, and magnets provided at the yokes.

Figure 3:
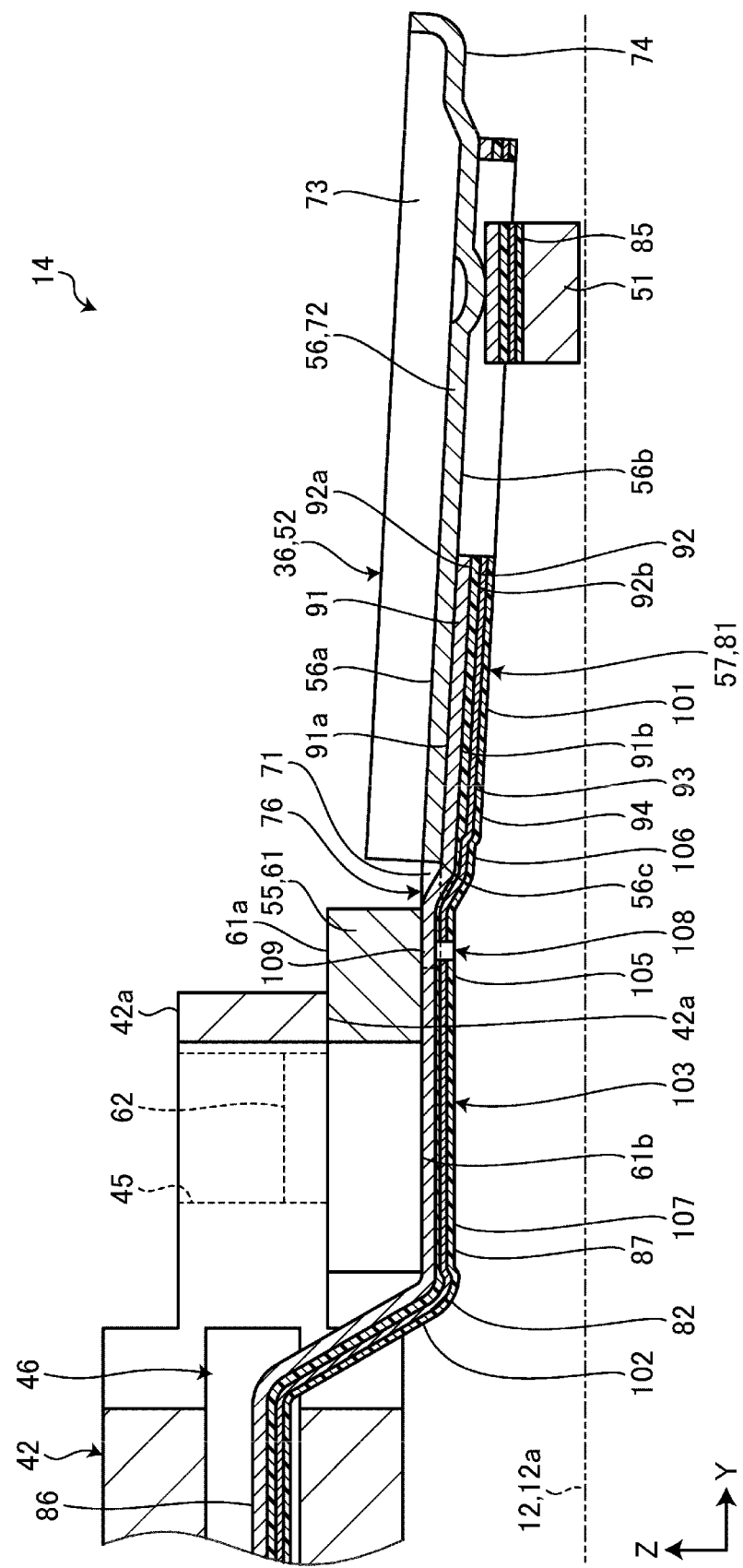
FIG. 3 is a cross-sectional view schematically illustrating part of the HGA and the arm of the first embodiment along a line F3-F3 in FIG. 2.

FIG. 3 is a cross-sectional view schematically illustrating part of the HGA 36 and the arm 42 of the first embodiment along the line F3-F3 in FIG. 2. As illustrated in FIG. 3, each of the plurality of arms 42 includes two seating surfaces 42a.

The seating surfaces 42a are provided at an end portion of the arm 42 in the +Y direction. The two seating surfaces 42a are located opposite to each other. One seating surface 42a is substantially flat and faces substantially the +Z direction. The other seating surface 42a is substantially flat and faces substantially the −Z direction.

As illustrated in FIG. 2, each of the plurality of arms 42 further includes an inner side surface 42b and an outer side surface 42c. The inner side surface 42b faces approximately in the +X direction. Further, the inner side surface 42b faces the central axis Axd. The outer side surface 42c is located on an opposite side of the inner side surface 42b. The outer side surface 42c faces approximately in the −X direction.

Each of the plurality of arms 42 is provided with a caulking hole 45 and a slit 46. The caulking hole 45 is a circular hole that penetrates the arm 42 substantially in the Z direction so as to open at the two seating surfaces 42a. The slit 46 opens at the outer side surface 42c and extends approximately in the Y direction along the outer side surface 42c. The slit 46 is closer to the central axis Axh than the caulking hole 45.

Each of the plurality of HGAs 36 is attached to the seating surface 42a of the arm 42 so as to protrude substantially in the +Y direction from the arm 42. Accordingly, the plurality of HGAs 36 is disposed at intervals in the Z direction. For the sake of understanding, one HGA 36 attached to the seating surface 42a facing the −Z direction is mainly explained in the following description and illustrated in FIG. 2 and the subsequent drawings. The HGA 36 attached to the seating surface 42a facing the +Z direction is formed substantially mirror-symmetrically with respect to the HGA 36 attached to the seating surface 42a facing the −Z direction.

Each of the plurality of HGA 36 includes a magnetic head 51 and a suspension 52. The magnetic head 51 may also be referred to as a slider. The magnetic head 51 records and replays information to and from the recording surface 12a of a corresponding one of the plurality of magnetic disks 12. In other words, the magnetic head 51 reads and writes information from and to the magnetic disk 12.

The carriage 35 rotates around the central axis Axh so as to move the magnetic head 51 with respect to the corresponding magnetic disk 12. The VCM 15 moves the magnetic head 51 to a desired position along the recording surface 12a of the magnetic disk 12 by rotating the carriage 35 around the central axis Axh.

When the magnetic head 51 is moved to the outer edge 12b of the magnetic disk 12 through the rotation of the HSA 14 by the VCM 15, the ramp load mechanism 16 in FIG. 1 holds the magnetic head 51 at a position separated from the magnetic disk 12.

The magnetic disk 12 is separated from the arm 42 in the Z direction. When the magnetic head 51 is located above the recording surface 12a of the magnetic disk 12, the seating surface 42a faces the magnetic disk 12.

The suspension 52 is attached to the arm 42 and holds the magnetic head 51. The suspension 52 includes a base plate 55, a load beam 56, and a flexure 57.

The base plate 55 and the load beam 56 are made of stainless steel, for example. The materials of the base plate 55 and the load beam 56 are not limited to this example. The base plate 55 and the load beam 56 may be made of materials different from each other.

The base plate 55 includes a plate 61 and a boss 62. The plate 61 is formed in a substantially quadrangular plate shape substantially orthogonal to the Z direction. As illustrated in FIG. 3, the plate 61 includes an inner surface 61a and an outer surface 61b. The outer surface 61b is an example of the first surface.

The inner surface 61a is substantially flat and faces substantially the +Z direction. The inner surface 61a and the seating surface 42a of the arm 42 face each other and are in contact with each other. The outer surface 61b is located on an opposite side of the inner surface 61a. The outer surface 61b is substantially flat and faces substantially the −Z direction. When the magnetic head 51 is located above the recording surface 12a of the magnetic disk 12, the outer surface 61b faces the recording surface 12a of the corresponding magnetic disk 12.

The boss 62 protrudes from the inner surface 61a. The boss 62 is formed in a substantially cylindrical shape and is fitted into the caulking hole 45 of the arm. The boss 62 is caulked to the arm 42, whereby the base plate 55 is attached to the arm 42 of the carriage 35. The base plate 55 may be attached to the arm 42 by another method.

The load beam 56 is formed in a plate shape thinner than the base plate 55. The load beam 56 includes two base tabs 71, a beam 72, two side rails 73, and a lift tab 74.

As illustrated in FIG. 2, the two base tabs 71 are separated in the Y direction from the boss 62 in the +Y direction. The two base tabs 71 are separated from each other in the X direction. The base tabs 71 are fixed to the outer surface 61b of the plate 61, for example, by spot welding. Accordingly, the load beam 56 is attached to the base plate 55. The base tabs 71 may be attached to the plate 61 by another method.

The beam 72 extends approximately in the +Y direction from the ends of the two base tabs 71 in the +Y direction. Specifically, the beam 72 extends obliquely at an angle from the base tabs 71 toward the corresponding magnetic disk 12 as illustrated in FIG. 3. For example, the beam 72 extends from the base tabs 71 in an oblique direction in the +Y direction and the −Z direction.

The load beam 56 further includes an inner surface 56a and an outer surface 56b. The inner surface 56a and the outer surface 56b are the surfaces of the load beam 56 provided at the base tabs 71 and the beam 72.

The inner surface 56a faces approximately the +Z direction. The inner surface 56a of the base tab 71 is in contact with the outer surface 61b of the plate 61. The outer surface 56b is located on an opposite side of the inner surface 56a and faces approximately the −Z direction. When the magnetic head 51 is located above the recording surface 12a of the magnetic disk 12, the outer surface 56b faces the recording surface 12a of the corresponding magnetic disk 12.

As illustrated in FIG. 2, the load beam 56 includes an edge 56c of the outer surface 56b. The edge 56c is located at an end portion of the outer surface 56b in the −Y direction. The edge 56c is located between the two base tabs 71. That is, the edge 56c is provided at an end of the outer surface 56b in the −Y direction at the beam 72.

In the present embodiment, the edge 56c is separated from the base plate 55 in the +Y direction. Accordingly, a through hole 76 is provided between the edge 56c and the base plate 55 in the Y direction and between the two base tabs 71 in the X direction.

The through hole 76 may be omitted. For example, the through hole 76 may be omitted by positioning the edge 56c on the base plate 55. Alternatively, the through hole 76 may be omitted by configuring the load beam 56 to include one base tab 71 located at substantially the center of the base plate 55 in the X direction.

The two side rails 73 protrude approximately in the +Z direction from both ends of the beam 72 in the X direction. As illustrated in FIG. 3, the side rails 73 protrude from the inner surface 56a of the beam 72. The two side rails 73 extend approximately in the Y direction along the both ends of the beam 72 in the X direction.

The lift tab 74 is provided at an end portion of the beam 72 in the +Y direction. When the ramp load mechanism 16 holds the magnetic head 51, the lift tab 74 is supported by the ramp load mechanism 16.

The flexure 57 is a type of flexible printed circuit board formed in an elongated strip shape. As illustrated in FIG. 2, the flexure 57 includes, for example, a main body 81 and a suspension tail 82.

The main body 81 partially covers the plate 61 and the beam 72. For example, the main body 81 partially covers the outer surface 61b of the plate 61 and the outer surface 56b of the load beam 56 at the beam 72. The main body 81 is attached to the outer surfaces 56b and 61b, for example, by spot welding.

A gimbal portion 85 is provided at an end portion of the main body 81 in the +Y direction. The magnetic head 51 is attached to the gimbal portion 85. The gimbal portion 85 includes, for example, a frame-shaped portion attached to the beam 72 and a portion on which the magnetic head 51 is mounted and which can be elastically displaced with respect to the frame-shaped portion. The gimbal portion 85 is not limited to this example.

The suspension tail 82 extends from an end portion of the main body 81 in the -Y direction toward the actuator block 41. An end of the suspension tail 82 in the -Y direction is connected to one end portion of the FPC 37 attached to the actuator block 41. The other end of the FPC 37 is connected to, for example, a connector provided at the bottom wall 25.

The suspension tail 82 includes an inner extension portion 86, an outer extension portion 87, and a tab 88. The inner extension portion 86 is accommodated in the slit 46. The outer extension portion 87 is located between the main body 81 and the inner extension portion 86. The outer extension portion 87 is located outside the slit 46 and is farther from the central axis Axd than the base plate 55.

As illustrated in FIG. 3, the inner extension portion 86 is farther from the corresponding magnetic disk 12 than the base plate 55 in the Z direction. At least part of the outer extension portion 87 is located between the base plate 55 and the corresponding magnetic disk 12 in the Z direction.

As illustrated in FIG. 2, the tab 88 extends approximately in the +X direction from the outer extension portion 87. The tab 88 is attached to the outer surface 61b of the plate 61, for example, by spot welding. The outer extension portion 87 extends obliquely at an angle from the vicinity of the tab 88 toward the inner extension portion 86.

As illustrated in FIG. 3, the flexure 57 is formed by stacking a plurality of layers. The flexure 57 includes, for example, a backing layer 91, a base layer 92, a conductive layer 93, and a cover layer 94. The backing layer 91 is an example of a substrate. The base layer 92 is an example of an insulating layer.

Each of the main body 81 and the suspension tail 82 includes part of each of the backing layer 91, the base layer 92, the conductive layer 93, and the cover layer 94. In other words, the backing layer 91, the base layer 92, the conductive layer 93, and the cover layer 94 are stacked on each of the main body 81 and the suspension tail 82.

The backing layer 91 is a flexible metal plate made of, for example, stainless steel. The backing layer 91 is not limited to this example. The backing layer 91 is thicker than each of the base layer 92, the conductive layer 93, and the cover layer 94. The rigidity of the backing layer 91 is higher than the rigidity of each of the base layer 92, the conductive layer 93, and the cover layer 94. The backing layer 91 includes an inner surface 91a and an outer surface 91b.

The inner surface 91a at the main body 81 faces approximately the +Z direction. The inner surface 91a at the main body 81 is in contact with the outer surface 61b of the plate 61 and the outer surface 56b of the load beam 56 at the beam 72.

The outer surface 91b is located on an opposite side of the inner surface 91a. The outer surface 91b at the main body 81 faces approximately the -Z direction. When the magnetic head 51 is located above the recording surface 12a of the magnetic disk 12, the outer surface 91b at the main body 81 faces the recording surface 12a of the corresponding magnetic disk 12.

The base layer 92 is made of, for example, an insulating material such as polyimide (PI). The base layer 92 includes an inner surface 92a and an outer surface 92b. The inner surface 92a adheres to the outer surface 91b of the backing layer 91. The outer surface 92b is located on an opposite side of the inner surface 92a.

The conductive layer 93 is made of metals such as copper and nickel covering the copper. The conductive layer 93 is located on the outer surface 92b of the base layer 92 and adheres to the outer surface 92b. Thus, the base layer 92 is located between the backing layer 91 and the conductive layer 93.

Figure 4:
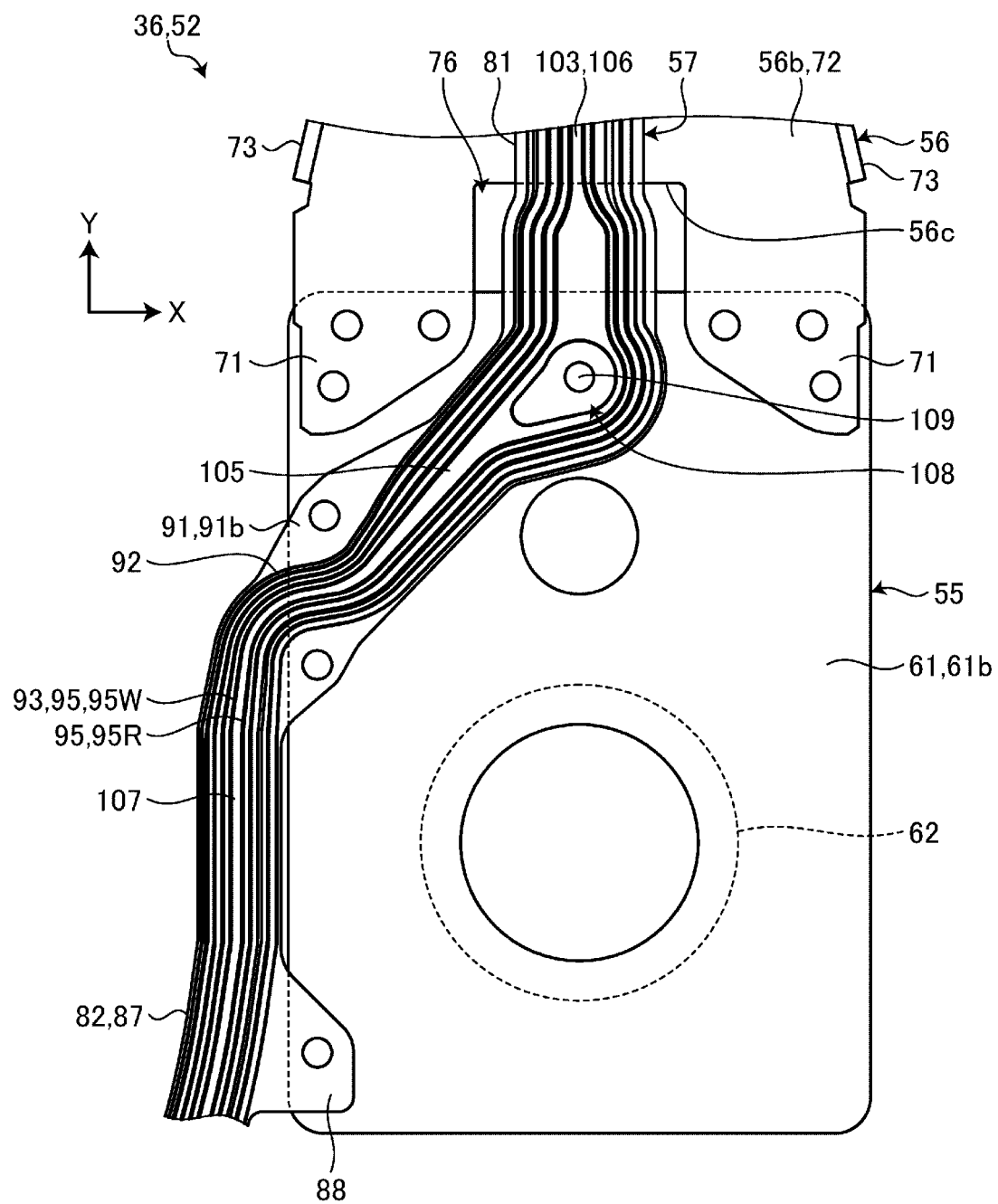
FIG. 4 is a plan view illustrating part of the HGA of the first embodiment.

FIG. 4 is a plan view illustrating part of the HGA 36 of the first embodiment. In FIG. 4, the cover layer 94 is omitted for the sake of understanding. As illustrated in FIG. 4, the conductive layer 93 includes a plurality of wirings 95. The conductive layer 93 may include other portions such as pads (lands) provided at end portions of the wirings 95.

The plurality of wirings 95 includes a write wiring 95W and a read wiring 95R. Each of the write wiring 95W and the read wiring 95R extends between the gimbal portion 85 and an end portion of the suspension tail 82 in the Y direction. Each of the write wiring 95W and the read wiring 95R is electrically connected to the magnetic head 51. The plurality of wirings 95 may include other wiring or wirings.

The cover layer 94 is made of, for example, an insulating material such as PI. As illustrated in FIG. 3, the cover layer 94 adheres to the outer surface 92b of the base layer 92 so as to cover the base layer 92 and the plurality of wirings 95. The cover layer 94 is provided with a hole exposing a pad of the conductive layer 93.

The PCB 17 in FIG. 1 is, for example, a rigid substrate such as a glass epoxy substrate, and is a multilayer substrate, a build-up substrate, or the like. The PCB 17 is located outside the housing 11 and is attached to the bottom wall 25.

For example, the PCB 17 is mounted with various types of electronic components such as a relay connector that is electrically connected to the FPC 37, an interface (I/F) connector that is connected to a host computer, and a controller that controls the operation of the HDD 10. The relay connector is electrically connected to the FPC 37 via the connector provided on the bottom wall 25.

The controller of the PCB 17 drives the VCM 15 to rotate the HSA 14 around the central axis Axh. Accordingly, the controller controls the position of the magnetic head 51. The controller may adjust the position of the magnetic head 51 by a piezoelectric element provided in the HGA 36.

In addition, the controller of the PCB 17 is electrically connected via the FPC 37 to the write wiring 95W and the read wiring 95R of the flexure 57. The controller outputs a write signal corresponding to the information to be written to the magnetic disk 12 by the magnetic head 51 to the magnetic head 51 via the write wiring 95W. The magnetic head 51 outputs a read signal corresponding to the information read from the magnetic disk 12 by the magnetic head 51 to the controller of the PCB 17 via the read wiring 95R. That is, the write wiring 95W transmits the write signal, and the read wiring 95R transmits the read signal.

As illustrated in FIG. 3, the flexure 57 is partially thinned. For example, the flexure 57 of the present embodiment includes two thick portions 101 and 102 and a thin portion 103. The thin portion 103 is thinner than the thick portions 101 and 102.

The total area of the thick portions 101 and 102 is larger than the area of the thin portion 103. In other words, the sum of the areas of the thick portions 101 and 102 is larger than the area of the thin portion 103 in a projection view seen in the Z direction as illustrated in FIG. 2.

Each of the thick portions 101 and 102 and the thin portion 103 includes part of each of the backing layer 91, the base layer 92, the conductive layer 93, and the cover layer 94. In other words, the backing layer 91, the base layer 92, the conductive layer 93, and the cover layer 94 are stacked on each of the thick portions 101 and 102 and the thin portion 103.

The thick portion 101 is provided in the main body 81 and includes the gimbal portion 85. That is, the thick portion 101 covers the outer surface 56b of the load beam 56 at the beam 72, and the magnetic head 51 is attached to the thick portion 101. The thick portion 102 is provided in the suspension tail 82 and includes the inner extension portion 86.

The thin portion 103 includes a first portion 105, a second portion 106, and a third portion 107. Each of the first portion 105, the second portion 106, and the third portion 107 is part of the thin portion 103.

The first portion 105, the second portion 106, and the third portion 107 are arranged in an extending direction of the flexure 57. The first portion 105 is provided between the second portion 106 and the third portion 107.

The first portion 105 is disposed on the outer surface 61b of the plate 61. In other words, the first portion 105 is provided in the main body 81 and covers the outer surface 61b of the plate 61. As illustrated in FIG. 4, at the first portion 105, the write wiring 95W and the read wiring 95R are partially non-parallel. At the first portion 105, other two of the plurality of wirings 95 may be non-parallel.

The first portion 105 is provided with a hole 108. The hole 108 is located between the write wiring 95W and the read wiring 95R that are non-parallel. The hole 108 penetrates the base layer 92, the conductive layer 93, and the cover layer 94, and exposes part of the outer surface 91b of the backing layer 91.

A welding portion 109, which is a portion of the backing layer 91 exposed by the hole 108, is attached to the plate 61 by, for example, spot welding. The welding portion 109 is a part of the first portion 105 and is attached substantially at the center of the plate 61 in the X direction. The welding portion 109 may be attached to another portion of the base plate 55.

The second portion 106 crosses the edge 56c in a projection view seen in the Z direction. For example, the second portion 106 is provided in the main body 81 and extends between the thick portion 101 and the first portion 105 so as to cross the edge 56c of the outer surface 56b of the load beam 56. In other words, the second portion 106 extends from the first portion 105 so as to cross the edge 56c.

A part of the second portion 106 is disposed on the outer surface 56b of the load beam 56 at the beam 72. Another part of the second portion 106 is disposed above the through hole 76. In other words, the second portion 106 partially covers the through hole 76.

The third portion 107 is farther from the central axis Axd than the base plate 55. For example, the third portion 107 is provided in the outer extension portion 87 and extends between the first portion 105 and the thick portion 102. The tab 88 extends from the third portion 107. That is, the third portion 107 is attached to the base plate 55 by the tab 88.

As illustrated in FIG. 3, the thickness of the base layer 92 at the thin portion 103 is smaller than the thickness of the base layer 92 at each of the thick portions 101 and 102. For example, the thickness of the base layer 92 at the thin portion 103 is equal to or less than half the thickness of the base layer 92 at each of the thick portions 101 and 102. The thickness of the base layer 92 at the thin portion 103 is not limited to this example.

The thicknesses of the backing layer 91, the conductive layer 93, and the cover layer 94 are substantially constant at the thick portions 101 and 102 and the thin portion 103. As an example, the thickness of the backing layer 91 is about 19 μm, the thickness of the conductive layer 93 is about 8 μm, and the thickness of the cover layer 94 is about 4 μm. The thickness of the base layer 92 at the thick portions 101 and 102 is about 10 μm and the thickness of the base layer 92 at the thin portion 103 is about 5 μm. The thicknesses of the backing layer 91, the base layer 92, the conductive layer 93, and the cover layer 94 are not limited to this example.

At least one of the backing layer 91, the conductive layer 93, and cover layer 94 may have a thickness at the thin portion 103 smaller than at the thick portions 101 and 102. For example, the thickness of the backing layer 91 at the thin portion 103 may be smaller than the thickness of the backing layer 91 at each of the thick portions 101 and 102.

As illustrated in FIG. 2, an end portion 103a of the thin portion 103 in the −Y direction is separated by a distance L1 toward the central axis Axh from the edge 56c which the second portion 106 crosses.

An end portion 103b of the thin portion 103 in the +Y direction is separated by 0.6 mm or more toward the magnetic head 51 from the edge 56c which the second portion 106 crosses. That is, a distance L2 in the Y direction between the end portion 103b of the thin portion 103 and the edge 56c is 0.6 mm or more. In the present embodiment, the distance L1 is longer than the distance L2.

Figure 5:
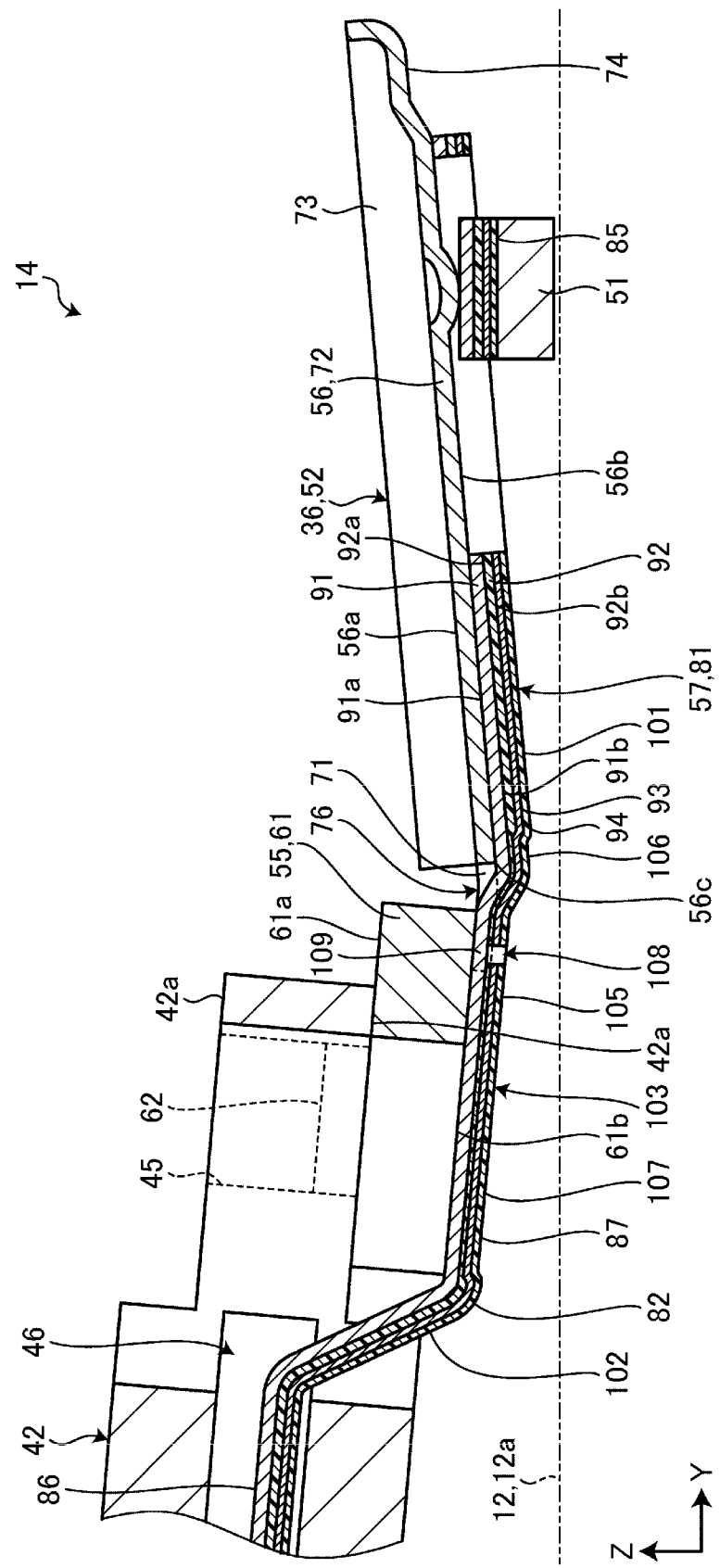
FIG. 5 is a cross-sectional view schematically illustrating part of the HGA and the arm of the first embodiment that is being subject to a shock or a vibration.

FIG. 5 is a cross-sectional view schematically illustrating part of the HGA 36 and the arm 42 of the first embodiment that is being subject to a shock or a vibration. For example, when a shock or a vibration acts on the HDD 10, the arm 42 may vibrate such that an end portion of the arm 42 in the +Y direction comes close to the magnetic disk 12.

When the magnetic head 51 is located above the recording surface 12a of the magnetic disk 12, the magnetic head 51 is lifted away from the recording surface 12a. Thus, even when the arm 42 vibrates, the position of the magnetic head 51 in the Z direction is maintained substantially constant.

On the other hand, when the end portion of the arm 42 in the +Y direction comes close to the magnetic disk 12, the edge 56c may come closer to the magnetic disk 12 than the gimbal portion 85. In that case, the load beam 56 is flexibly bent around the vicinity of the edge 56c as a supporting point.

Since the edge 56c comes close to the magnetic disk 12, for example, the second portion 106 of the thin portion 103 comes closer to the magnetic disk 12 than the other portions of the flexure 57. However, the thin portion 103 is made thin, and thus is less likely to come into contact with the magnetic disk 12.

When a shock or a vibration acts on the HDD 10, the magnetic disk 12 may vibrate. In that case, the amplitude of the magnetic disk 12 is maximum at the outer edge 12b of the magnetic disk 12. That is, the outer edge 12b of the magnetic disk 12 may vibrate so as to come close to the flexure 57.

When the HGA 36 is located in the vicinity of the outer edge 12b of magnetic disk 12 indicated by the dash-double-dot line in FIG. 2, the outer extension portion 87 of the flexure 57 comes to be adjacent to the outer edge 12b of magnetic disk 12. In this situation, when the magnetic disk 12 vibrates, the outer edge 12b of the magnetic disk 12 comes close to the outer extension portion 87.

In the present embodiment, the third portion 107 of the thin portion 103 is provided at the outer extension portion 87. In addition, the third portion 107 is attached to the base plate 55 by the tab 88. That is, the tab 88 restricts the third portion 107 from being separated from the base plate 55 so as to come close to the magnetic disk 12. Thus, the third portion 107 is less likely to come into contact with the outer edge 12b of the magnetic disk 12 that is vibrating.

The first portion 105 is attached to the base plate 55 at the welding portion 109. That is, the welding portion 109 restricts the first portion 105 from being separated from the base plate 55 so as to come close to the magnetic disk 12. Thus, the first portion 105 is less likely to come into contact with the magnetic disk 12.

In the HDD 10 according to the first embodiment described above, the base plate 55 includes the outer surface 61b configured to face the magnetic disk 12. The flexure 57 includes the thin portion 103 which is thinner than the other portions (the thick portions 101 and 102) of the flexure 57. The thin portion 103 includes the first portion 105 covering the outer surface 61b. At the first portion 105, at least two of the plurality of wirings 95 are non-parallel. The first portion 105 is disposed on the outer surface 61b of the base plate 55, and thus is located in the vicinity of the magnetic disk 12. However, the first portion 105 is made thinner than the other portions of the flexure 57, and thus it can be suppressed from coming into contact with the magnetic disk 12. Further, the first portion 105 is disposed on the outer surface 61b of the base plate 55, and thus it can be set as a portion to be attached to the base plate 55. At the first portion 105, at least two of the plurality of wirings 95 are non-parallel, and thus the degree of freedom in design is higher than that in a case where the arrangement is limited to a parallel arrangement. Accordingly, in the HDD 10 of the present embodiment, a portion at which the flexure 57 is attached to the base plate 55 (for example, the welding portion 109) can be easily provided. For example, the first portion 105 can be easily provided with the welding portion 109 which is attached substantially at the center of the plate 61, as compared to a case where the plurality of wirings 95 are parallel. By attaching the flexure 57 to the base plate 55, it is possible to suppress the flexure 57 from being separated from the base plate 55 to come close to the magnetic disk 12, and consequently suppress the flexure 57 from coming into contact with the magnetic disk 12.

The flexure 57 includes the backing layer 91 and the base layer 92 which is located between the backing layer 91 and the plurality of wirings 95. The plurality of wirings 95 includes the write wiring 95W and the read wiring 95R. The first portion 105 is provided with the hole 108. The hole 108 is located between the write wiring 95W and the read wiring 95R that are non-parallel and exposes the backing layer 91. Since the write wiring 95W and the read wiring 95R are non-parallel, the hole 108 can be easily provided between the write wiring 95W and the read wiring 95R at the flexure 57.

The welding portion 109, which is a portion of the backing layer 91 exposed by the hole 108, is attached to the base plate 55. For example, the backing layer 91 can be welded to the base plate 55 through the hole 108a by a welding gun. Accordingly, in the HDD 10 of the present embodiment, the flexure 57 can be easily attached to the base plate 55.

The load beam 56 includes the outer surface 56b that faces the magnetic disk 12. The thin portion 103 includes the second portion 106 extending from the first portion 105 so as to cross the edge 56c of the outer surface 56b. In general, when the arm 42 of the carriage 35 is bent such that a leading end of the arm 42 comes close to the magnetic disk 12 due to, for example, a shock or a vibration, the edge 56c of the outer surface 56b of the load beam 56, which is adjacent to the base plate 55, comes close to the magnetic disk 12. That is, the second portion 106, which crosses the edge 56c of the outer surface 56b, may come close to the magnetic disk 12. However, the second portion 106 is made thinner than the other portions of the flexure 57, and thus it can be suppressed from coming into contact with the magnetic disk 12.

One end portion 103a of the thin portion 103 is separated by a distance L1 toward the central axis Axh from the edge 56c of the outer surface 56b which the second portion 106 crosses. The other end portion 103b of the thin portion 103 is separated by 0.6 mm or more toward the magnetic head 51 from the edge 56c of the outer surface 56b which the second portion 106 crosses. Accordingly, the thin portion 103 extends over a predetermined length, whereby the flexure 57 can be suppressed from coming into contact with the magnetic disk 12.

The magnetic disk 12 is configured to rotate around the central axis Axd which is separated from the central axis Axh. The third portion 107 is farther from the central axis Axd than the base plate 55. When the magnetic head 51 is located in the vicinity of the outer edge 12b of the magnetic disk 12, the third portion 107 is located in the vicinity of the outer edge 12b of the magnetic disk 12. The magnetic disk 12 may be bent such that the outer edge 12b of the magnetic disk 12 comes close to the flexure 57, for example, due to a shock or a vibration. However, the third portion 107 is made thinner than the other portions of the flexure 57, and thus can be suppressed from coming into contact with the magnetic disk 12.

The thickness of the base layer 92 at the thin portion 103 is smaller than the thickness of the base layer 92 at the other portions of the flexure 57. In general, the base layer 92 such as PI may be formed by a method such as photolithography in which the thickness can be adjusted. That is, it is easier to partially thin the base layer 92 than to partially thin, for example, the backing layer 91. Thus, the thin portion 103 can be easily made thinner than the other portions of the flexure 57, as compared to a case where the backing layer 91 is thinned.

The thickness of the base layer 92 at the thin portion 103 is equal to or less than half the thickness of the base layer 92 at the other portions of the flexure 57. Accordingly, the flexure 57 can be suppressed from coming into contact with the magnetic disk 12.

Second Embodiment

A second embodiment will be described below with reference to FIGS. 6 to 8. In the description of the embodiment below, components having the same functions as the functions of the above-described components may be denoted by the same reference signs as the reference signs of the already-described components, and the descriptions of the components may be omitted. In addition, a plurality of components denoted by the same reference sign does not necessarily have the same functions and properties, and may have different functions and properties according to each embodiment.

Figure 6:
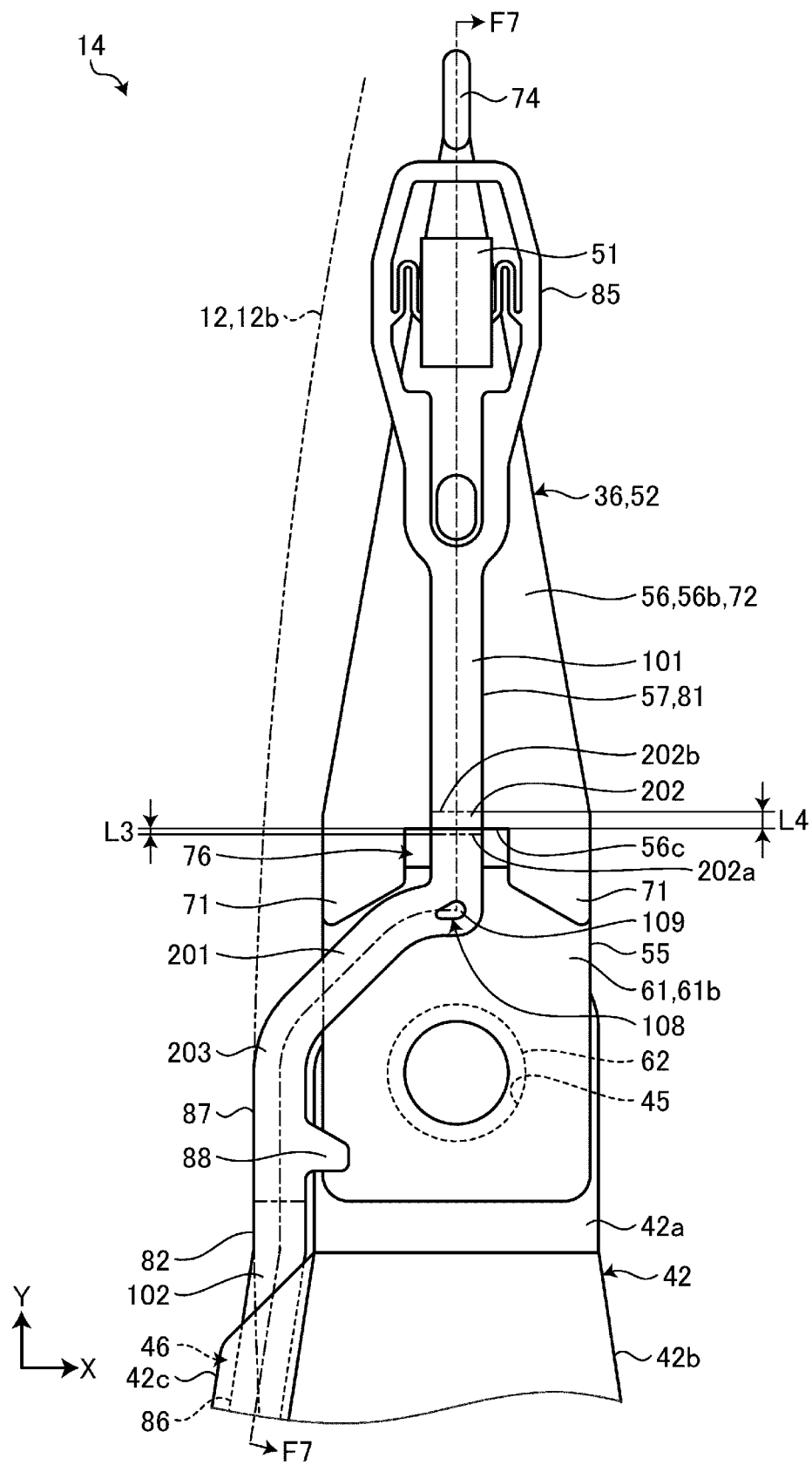
FIG. 6 is a plan view partially illustrating an HGA and an arm according to a second embodiment.

FIG. 6 is a plan view partially illustrating the HGA 36 and the arm 42 of the second embodiment. FIG. 7 is a cross-sectional view schematically illustrating part of the HGA 36 and the arm 42 of the second embodiment along the line F7-F7 in FIG. 6.

As illustrated in FIG. 6, the flexure 57 of the second embodiment includes a thick portion 201 and two thin portions 202 and 203 instead of the thin portion 103.

The thick portion 201 is provided at the flexure 57 instead of the first portion 105 of the thin portion 103 of the first embodiment. That is, the thick portion 201 is provided in the main body 81 and covers the outer surface 61b of the plate 61. At the thick portion 201, the write wiring 95W and the read wiring 95R are partially non-parallel.

The thick portion 201 is provided with the hole 108. The backing layer 91 at the thick portion 201 includes the welding portion 109. The welding portion 109 is exposed by the hole 108 and attached to the plate 61 by, for example, spot welding.

The thin portion 202 is provided at the flexure 57 instead of the second portion 106 of the thin portion 103 of the first embodiment. That is, the thin portion 202 is provided in the main body 81 and extends between the thick portion 101 and the thick portion 201 so as to cross the edge 56c.

The thin portion 203 is provided at the flexure 57 instead of the third portion 107 of the thin portion 103 of the first embodiment. That is, the thin portion 203 is farther from the central axis Axd than the base plate 55. The thin portion 203 is provided in the outer extension portion 87 and extends between the thick portion 102 and the thick portion 201. The tab 88 extends from the thin portion 203 and attaches the thin portion 203 to the base plate 55.

Figure 7:
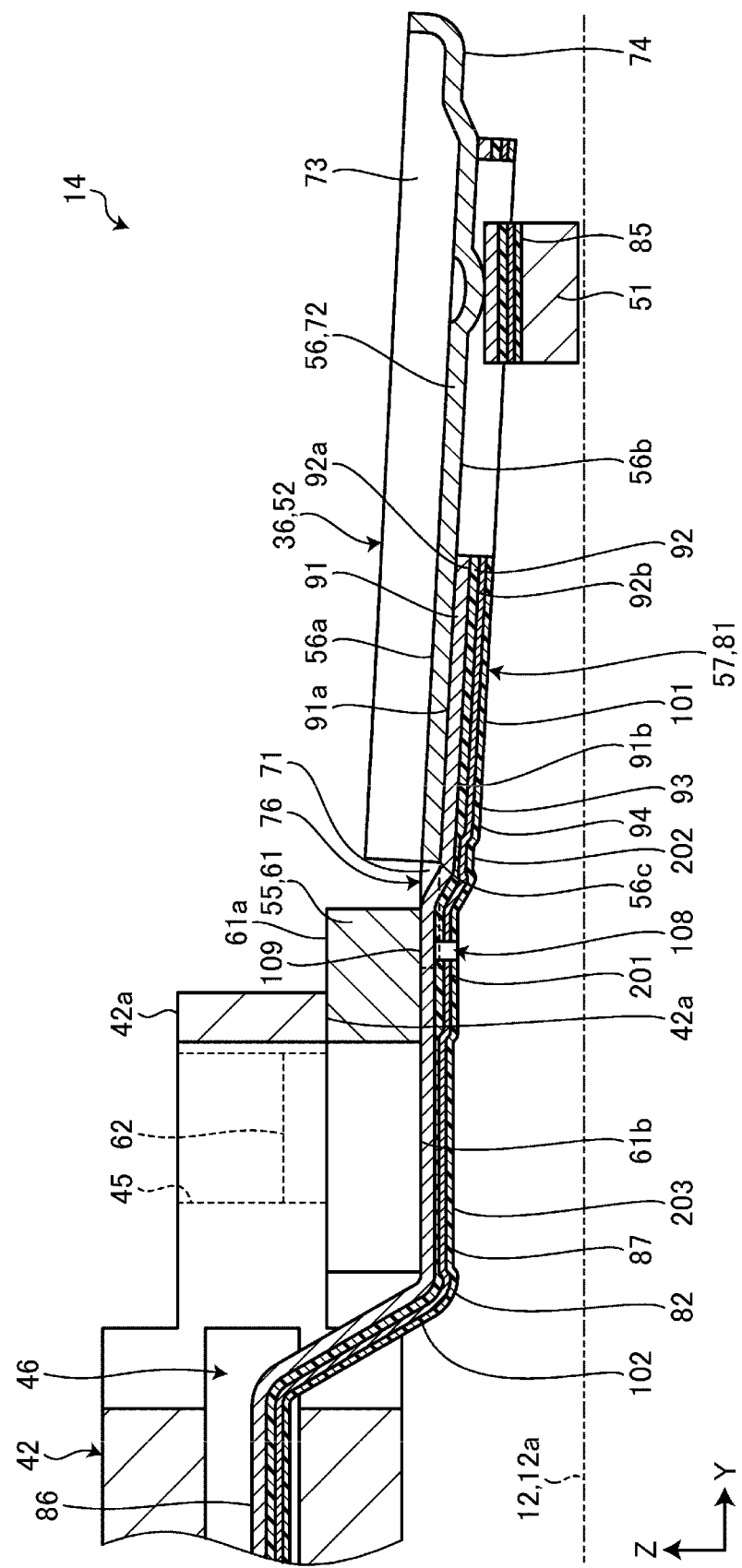
FIG. 7 is a cross-sectional view schematically illustrating part of the HGA and the arm of the second embodiment along a line F7-F7 in FIG. 6.

As illustrated in FIG. 7, each of the thin portions 202 and 203 is thinner than each of the thick portions 101, 102, and 201. For example, the thickness of the base layer 92 at the thin portions 202 and 203 is equal to or less than half the thickness of the base layer 92 at each of the thick portions 101, 102, and 201. The thickness of the base layer 92 at the thin portions 202 and 203 is not limited to this example.

As illustrated in FIG. 6, the total area of the thick portions 101, 102, and 201 is larger than the total area of the thin portions 202 and 203. In other words, the sum of the areas of the thick portions 101, 102, and 201 is larger than the sum of the areas of the thin portions 202 and 203 in a projection view seen in the Z direction.

An end portion 202a of the thin portion 202 in the −Y direction is separated by 0.1 mm or more toward the central axis Axh from the edge 56c which the thin portion 202 crosses. That is, a distance L3 in the Y direction between the end portion 202a of the thin portion 202 and the edge 56c is 0.1 mm or more.

An end portion 202b of the thin portion 202 in the +Y direction is separated by 0.6 mm or more toward the magnetic head 51 from the edge 56c which the thin portion 202 crosses. That is, a distance L4 in the Y direction between the end portion 202b of the thin portion 202 and the edge 56c is 0.6 mm or more.

Figure 8:
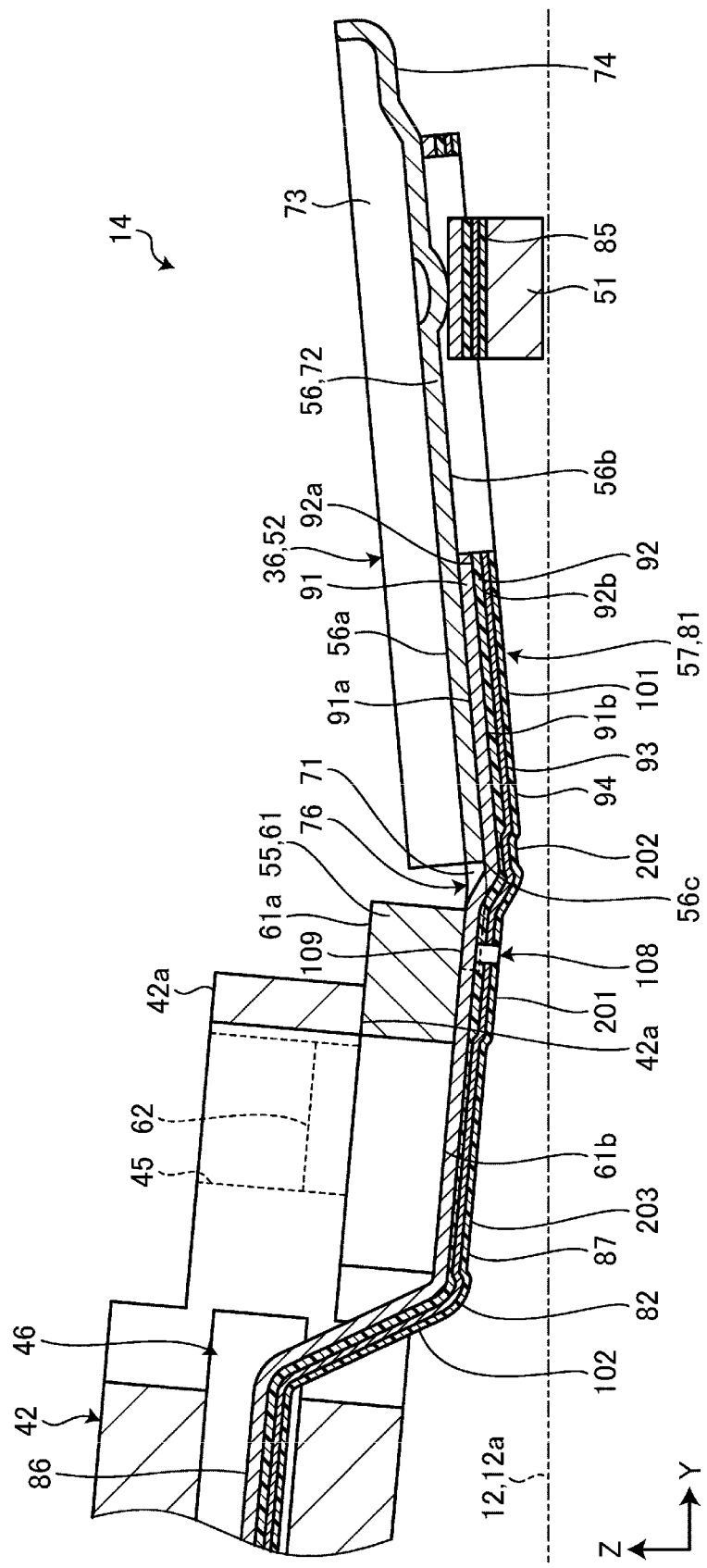
FIG. 8 is a cross-sectional view schematically illustrating part of the HGA and the arm of the second embodiment that is being subject to a shock or a vibration.

FIG. 8 is a cross-sectional view schematically illustrating part of the HGA 36 and the arm 42 of the second embodiment that is being subject to a shock or a vibration. As illustrated in FIG. 8, when an end portion of the arm 42 in the +Y direction comes close to the magnetic disk 12 due to an impact or a vibration, the load beam 56 is elastically bent around the vicinity of the edge 56c as a supporting point.

Since the edge 56c comes close to the magnetic disk 12, for example, the thin portion 202 comes closer to the magnetic disk 12 than the other portions of the flexure 57. However, the thin portion 202 is made thin, and thus is less likely to come into contact with the magnetic disk 12.

When the HGA 36 is located in the vicinity of the outer edge 12b of the magnetic disk 12 indicated by the dash-double-dot line in FIG. 6, the outer edge 12b of the magnetic disk 12 comes close to the thin portion 203 due to a shock or a vibration. However, the thin portion 203 is made thin, and thus is less likely to come into contact with the magnetic disk 12.

On the other hand, when the base layer 92 is thin, the impedance in the wirings 95 increases, which may cause an impact on transmission characteristics. However, the thin portions 202 and 203 are smaller in area than the thick portions 101, 102, and 201. Thus, the impact on the transmission characteristics caused by thinning the base layer 92 is small at the thin portions 202 and 203.

In the HDD 10 of the second embodiment described above, the flexure 57 includes the thick portions 101 and 201 and the thin portions 202 and 203. The thick portion 201 covers the outer surface 61b of the base plate 55. The thick portion 101 covers the outer surface 56b of the load beam 56. The thin portion 202 extends between the thick portion 201 and the thick portion 101 so as to cross the edge 56c of the outer surface 56b. The thin portion 203 is farther from the central axis Axd than the base plate 55. In general, when the arm 42 of the carriage 35 is bent such that a leading end of the arm 42 comes close to the magnetic disk 12 due to, for example, a shock or a vibration, the edge 56c of the outer surface 56b of the load beam 56, which is adjacent to the base plate 55, comes close to the magnetic disk 12. That is, the thin portion 202, which crosses the edge 56c of the outer surface 56b, may come close to the magnetic disk 12. However, the thin portion 202 is made thinner than the other portions of the flexure 57 such as the thick portions 101 and 201, and thus it can be suppressed from coming into contact with the magnetic disk 12. When the magnetic head 51 is located in the vicinity of the outer edge 12b of the magnetic disk 12, the thin portion 203 is located in the vicinity of the outer edge 12b of the magnetic disk 12. The magnetic disk 12 may be bent such that the outer edge 12b of the magnetic disk 12 comes close to the flexure 57, for example, due to a shock or a vibration. However, the thin portion 203 is made thinner than the other portions of the flexure 57 such as the thick portions 101 and 201, and thus it can be suppressed from coming into contact with the magnetic disk 12. As described above, in the HDD 10 of the present embodiment, the flexure 57 can be suppressed from coming into contact with the magnetic disk 12. In addition, since the other portions of the flexure 57 such as the thick portions 101 and 201 are thicker than the thin portions 202 and 203, the flexure 57 can suppress the increase in the impedance in the wirings 95 due to thinning of the flexure 57, and consequently, the impact on the transmission characteristics caused by providing the thin portions 202 and 203 can be reduced.

The thickness of the base layer 92 at each of the thin portions 202 and 203 is smaller than the thickness of the base layer 92 at each of the thick portions 101 and 201. It is easier to partially thin the base layer 92 such as PI than to partially thin, for example, the backing layer 91. Thus, the thin portions 202 and 203 can be easily made thinner than the thick portions 101 and 201, as compared to a case where the backing layer 91 is thinned.

The thickness of the base layer 92 at each of the thin portions 202 and 203 is equal to or less than half the thickness of the base layer 92 at each of the thick portions 101 and 201. Accordingly, the flexure 57 can be suppressed from coming into contact with the magnetic disk 12.

One end portion 202a of the thin portion 202 is separated by 0.1 mm or more toward the central axis Axh from the edge 56c of the outer surface 56b which the thin portion 202 crosses. The other end portion 202b of the thin portion 202 is separated by 0.6 mm or more toward the magnetic head 51 from the edge 56c of the outer surface 56b which the thin portion 202 crosses. Accordingly, the thin portion 202 which is made thin extends over a predetermined length, and can be suppressed from coming into contact with the magnetic disk 12.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk apparatus comprising:
   a carriage configured to rotate around a first rotation axis;
   a magnetic disk;
   a base plate attached to the carriage and including a first surface that faces the magnetic disk;
   a load beam attached to the base plate;
   a flexure including a plurality of wirings and attached to the base plate and the load beam; and
   a magnetic head attached to the flexure, electrically connected to at least one of the plurality of wirings, and configured to write and read information to and from the magnetic disk,
   the flexure including a thin portion, the thin portion being thinner than other portions of the flexure, and
   the thin portion including a first portion that covers the first surface of the base plate and includes at least two of the plurality of wirings, wherein the two wirings of the first portion are non-parallel.

2. The disk apparatus according to claim 1, wherein
   the flexure includes a substrate and an insulating layer located between the substrate and the plurality of wirings,
   the plurality of wirings includes
      a write wiring electrically connected to the magnetic head and configured to transmit a write signal corresponding to information to be written to the magnetic disk by the magnetic head, and
      a read wiring electrically connected to the magnetic head and configured to transmit a read signal corresponding to information read from the magnetic disk by the magnetic head, and
   the first portion includes a hole, the hole being located between the write wiring and the read wiring and exposing the substrate, the write wiring and the read wiring being non-parallel.

3. The disk apparatus according to claim 2, wherein a portion of the substrate exposed by the hole is attached to the base plate.

4. The disk apparatus according to claim 1, wherein
   the load beam includes a second surface that faces the magnetic disk, and
   the thin portion includes a second portion extending from the first portion to cross an edge of the second surface.

5. The disk apparatus according to claim 4, wherein
   one end portion of the thin portion extends toward the first rotation axis from the edge of the second surface which the second portion crosses,
   another end portion of the thin portion is separated by 0.6 mm or more toward the magnetic head from the edge of the second surface which the second portion crosses.

6. The disk apparatus according to claim 5, wherein
   the magnetic disk is configured to rotate around a second rotation axis separated from the first rotation axis, and
   the thin portion includes a third portion that is farther from the second rotation axis than the base plate.

7. The disk apparatus according to claim 1, wherein
   the flexure includes a substrate and an insulating layer located between the substrate and the plurality of wirings, and
   a thickness of the insulating layer at the thin portion is smaller than a thickness of the insulating layer at the other portions of the flexure.

8. The disk apparatus according to claim 7, wherein the thickness of the insulating layer at the thin portion is equal to or less than half the thickness of the insulating layer at the other portions of the flexure.

9. A disk apparatus comprising:
   a carriage configured to rotate around a first rotation axis;
   a magnetic disk configured to rotate around a second rotation axis separated from the first rotation axis;
   a base plate attached to the carriage and including a first surface that faces the magnetic disk;
   a load beam attached to the base plate and including a second surface that faces the magnetic disk;
   a flexure including
      a first portion covering the first surface,
      a second portion covering the second surface,
      a first thin portion extending between the first portion and the second portion and crossing an edge of the second surface, and
      a second thin portion farther from the second rotation axis than the base plate,
      wherein each of the first thin portion and the second thin portion is thinner than each of the first portion and the second portion; and
   a magnetic head attached to the second portion and configured to write and read information to and from the magnetic disk.

10. The disk apparatus according to claim 9, wherein
    the flexure includes a plurality of wirings, a substrate, and an insulating layer located between the substrate and the plurality of wirings, and
    a thickness of the insulating layer at each of the first thin portion and the second thin portion is smaller than a thickness of the insulating layer at each of the first portion and the second portion.

11. The disk apparatus according to claim 10, wherein the thickness of the insulating layer at each of the first thin portion and the second thin portion is equal to or less than half the thickness of the insulating layer at each of the first portion and the second portion.

12. The disk apparatus according to claim 9, wherein
one end portion of the first thin portion is separated by 0.1 mm or more toward the first rotation axis from the edge of the second surface which the first thin portion crosses,
another end portion of the first thin portion is separated by 0.6 mm or more toward the magnetic head from the edge of the second surface which the first thin portion crosses.

13. A disk apparatus comprising:
a carriage including a plurality of arms and configured to rotate around a first rotation axis;
a magnetic disk;
a suspension attached to one of the arms and including a base plate, a load beam attached to the base plate, and a flexure having wires and attached to the base plate and the load beam, the flexure comprising a main body and a suspension tail; and
a magnetic head attached to the flexure, electrically connected to the wires, and configured to write and read information to and from the magnetic disk, wherein
the flexure has one or more first portions and one or more second portions along the length thereof, the first portion having a thickness that is equal to or less than half of a thickness of the second portion,
at least one of the one or more first portions and at least one of the one or more second portions are provided in the main body and cover a surface region of the base plate that faces the magnetic disk, and
the wires are non-parallel at some locations of the flexure and include a read wiring for transmitting a read signal from the magnetic head and a write wiring for transmitting a write signal to the magnetic head.

14. The disk apparatus according to claim 13, wherein the flexure includes a substrate and an insulating layer located between the substrate and the wires.

15. The disk apparatus according to claim 14, wherein one first portion is located between two second portions.

16. The disk apparatus according to claim 15, wherein the one first portion of the flexure has a hole that exposes the substrate and a portion of the substrate exposed by the hole is attached to the base plate.

17. The disk apparatus according to claim 15, wherein
the load beam has tab portions that are attached to the base plate and an edge that is separated from the base plate in a longitudinal direction, and
the one first portion crosses an edge of the load beam in the longitudinal direction.

18. The disk apparatus according to claim 14, wherein one second portion is located between two first portions.

19. The disk apparatus according to claim 18, wherein the one second portion of the flexure has a hole that exposes the substrate and a portion of the substrate exposed by the hole is attached to the base plate.

20. The disk apparatus according to claim 18, wherein
the load beam has tab portions that are attached to the base plate and an edge that is separated from the base plate in a longitudinal direction, and
one of the two first portions crosses an edge of the load beam in the longitudinal direction.

* * * * *